(12) United States Patent
De Mattia

(10) Patent No.: US 10,124,568 B2
(45) Date of Patent: Nov. 13, 2018

(54) METHOD OF MANUFACTURING A CURVED PROFILE MADE OF COMPOSITE MATERIAL FROM A RECTILINEAR PREFORM OF FIBER PLIES

(71) Applicant: Airbus Operations SAS, Toulouse (FR)

(72) Inventor: Denis De Mattia, Basse Goulaine (FR)

(73) Assignee: Airbus Operations SAS, Toulouse (FR)

( * ) Notice: Subject to any disclaimer, the term of this patent is extended or adjusted under 35 U.S.C. 154(b) by 645 days.

(21) Appl. No.: 13/792,499

(22) Filed: Mar. 11, 2013

(65) Prior Publication Data

US 2013/0233474 A1 Sep. 12, 2013

(30) Foreign Application Priority Data

Mar. 12, 2012 (FR) ..................... 12 52172

(51) Int. Cl.
*B32B 38/00* (2006.01)
*B29C 70/34* (2006.01)
(Continued)

(52) U.S. Cl.
CPC ........ *B32B 38/0012* (2013.01); *B29C 53/083* (2013.01); *B29C 70/342* (2013.01);
(Continued)

(58) Field of Classification Search
CPC ....... B29K 2105/108; B29L 2031/3082; B29C 53/086; B64C 1/064
(Continued)

(56) References Cited

U.S. PATENT DOCUMENTS

2009/0057948 A1\* 3/2009 Krogager et al. ............ 264/258
2011/0086199 A1 4/2011 Duqueine et al.
(Continued)

FOREIGN PATENT DOCUMENTS

| FR | 2928294 | 9/2009 |
| FR | 2928295 | 9/2009 |
| WO | 2009037647 | 3/2009 |

OTHER PUBLICATIONS

Compression Behavior of A=45-Dominated Laminates with a Circular Hole or Impact Damage; Mark J. Shuart and Jerry G. Williams; AIAA Journal 1986 24:1, 115-122; Retrived from the Internet Jun. 12, 2017.\*
(Continued)

*Primary Examiner* — Michael N Orlando
*Assistant Examiner* — Marta S Dulko
(74) *Attorney, Agent, or Firm* — Greer, Burns & Crain, Ltd.

(57) ABSTRACT

A method of manufacturing a curved profile from a rectilinear preform of pre-impregnated fiber plies. The method includes stacking plies on a deformable mandrel and winding the deformable mandrel and the stacked plies on a bending tool along a rotation axis, the profile comprising a stack of N plies. At least one first section of the profile is arranged along a plane perpendicular to the axis of rotation and at least one second section is arranged in a plane parallel to the axis. The method includes the steps of stacking the N plies of fibers on the deformable mandrel, bending in a single step the N plies sandwiched between the deformable mandrel and the bending tool and polymerizing the bent N plies. The curved profile comprises M plies with fibers oriented at A° relative to a longitudinal direction and M+/- 5% plies with fibers oriented at -A°.

14 Claims, 2 Drawing Sheets

(51) Int. Cl.
*B29D 99/00* (2010.01)
*B29C 53/08* (2006.01)
*B29L 31/00* (2006.01)
*B29L 31/30* (2006.01)
*B29K 105/08* (2006.01)

(52) U.S. Cl.
CPC .. *B29D 99/0003* (2013.01); *B29K 2105/0872* (2013.01); *B29L 2031/003* (2013.01); *B29L 2031/3082* (2013.01); *B29L 2031/7739* (2013.01); *Y10T 156/1044* (2015.01)

(58) Field of Classification Search
USPC .......................................................... 156/222
See application file for complete search history.

(56) References Cited

U.S. PATENT DOCUMENTS

| | | | |
|---|---|---|---|
| 2011/0100538 A1* | 5/2011 | Inserra Imparato | .. B29C 70/446 156/213 |
| 2011/0104432 A1* | 5/2011 | Duqueine | ............ B29C 33/405 428/113 |
| 2011/0259508 A1 | 10/2011 | Inserra Imparato et al. | |
| 2013/0189482 A1* | 7/2013 | Dequine | ....................... 428/130 |

OTHER PUBLICATIONS

French Search Report, dated Nov. 27, 2012.

\* cited by examiner

METHOD OF MANUFACTURING A CURVED PROFILE MADE OF COMPOSITE MATERIAL FROM A RECTILINEAR PREFORM OF FIBER PLIES

CROSS-REFERENCES TO RELATED APPLICATIONS

This application claims the benefit of the French patent application No. 12 52172 filed on Mar. 12, 2012, the entire disclosures of which are incorporated herein by way of reference.

BACKGROUND OF THE INVENTION

The present invention relates to a method of manufacturing a curved profile made of composite material from a rectilinear preform of fiber plies. The invention more particularly relates to a method of manufacturing an aircraft fuselage frame.

According to an embodiment shown in FIG. 1, an aircraft fuselage frame 10 is in the form of a profile having a Z-shaped cross-section whose central portion referred to as a core 12 forms a complete or partial ring. The profile comprises a first wing 14 referred to as an inner wing arranged in the area of the inner edge of the core 12 and perpendicular to the latter and a second wing 16 referred to as an outer wing arranged in the area of the outer edge of the core 12, also perpendicular to the latter.

A method of manufacturing such a composite material frame is described in document FR-2.928.295.

According to this document, first, a substantially rectangular strip is made by stacking on top of one another three plies of pre-impregnated fibers, each ply having fibers oriented along a direction, the strip comprising plies with different fiber orientations, a ply with fibers at 30°, a ply with fibers at 90° and another ply with fibers at 150°.

Then, the strip of fiber plies is arranged on a mandrel made of deformable material, then compressed on this mandrel so as to conform to the shape thereof.

The deformable mandrel is capable of changing shape between a rectilinear position and a curved position but presents an incompressible or quasi-incompressible transverse section.

Subsequently, the deformed strip arranged on the mandrel made of deformable material is placed in contact with a heated tool having, in the periphery thereof, radial sections having a profile complementary to the transverse sections of the mandrel. During bending, the strip is compressed and subjected to an increase in temperature.

Subsequent to the setting in place of this first strip, a second strip of three pre-impregnated fiber plies is cut, then arranged in another deformable mandrel and compressed on the latter.

Then, this second strip deformed on its mandrel made of deformable material is placed in contact with the first strip still in place on the tool, then compressed against the first strip.

To obtain a frame requires, as previously stated, attaching several strips on top of one another before the assembly thus formed is polymerized.

In addition, strips with fibers oriented at 0° can be manually added between certain strips.

This mode of operation is not fully satisfactory for the following reasons:

First, the implementation is relatively long and tedious because the profile is made step by step, a large number of strips having to be deformed and bent successively.

Second, the relative positioning between the strips is difficult to carry out since the strips are constituted of pre-impregnated fibers and cannot easily glide with respect to one another to correct their relative positions. Therefore, it is difficult to ensure that, during bending, the two inner wings of the two strips, the two cores of the two strips, and the two outer wings of the two strips are perfectly in contact with one another over the entire length of the frame. Considering the difficulties of the setting in place, the operators must intervene numerous times to attempt to manually correct the observed defect.

According to another drawback, as the strips are being stacked up, the value of the outer radii increases whereas that of the inner radii decreases, which means that the difference in value between the strip already in place on the bending tool and the attached strip causes a defect referred to as a bridge, the two strips not being closely flattened again one another at the bottom of the radius of curvature. This defect causes, during the polymerization, some undulations that negatively affect the quality of the part.

According to another drawback, it is impossible to bend the strips once they are compacted without causing gliding between the plies of pre-impregnated fibers and thus undulations or wrinkles of fibers.

Finally, the plies of the first strip stay in contact with the tool heated at a temperature on the order of 50° C. much longer than the plies of the last strip attached, which causes the resin impregnating the first plies to age in an accelerated, uncontrolled manner.

SUMMARY OF THE INVENTION

Therefore, the present invention aims at overcoming the drawbacks of the prior art by providing a method of manufacturing a curved profile made of composite material from a rectilinear preform of fiber plies allowing for time and cost savings while limiting the risks of the part thus manufactured to be rejected.

To this end, the object of the invention is a method of manufacturing a curved profile from a rectilinear preform of pre-impregnated fiber plies, said method consisting of stacking plies on a deformable mandrel and of winding said deformable mandrel and stacked plies on a bending tool along a rotation axis, said profile comprising a stack of N plies, at least one first section of the profile being arranged along a plane perpendicular to the axis of rotation and at least one second section parallel to the axis, characterized in that it consists of stacking the N plies of fibers on the deformable mandrel, bending in a single step the N plies sandwiched between the deformable mandrel and the bending tool and polymerizing said bent N plies, said curved profile comprising M plies with fibers oriented at A° and M+/−5% plies with fibers oriented at −A°.

BRIEF DESCRIPTION OF THE DRAWINGS

Other characteristics and advantages will become apparent from the description of the invention that follows, a description given only by way of example, in view of the annexed drawings, wherein.

DETAILED DESCRIPTION OF THE PREFERRED EMBODIMENTS

Figure 1:
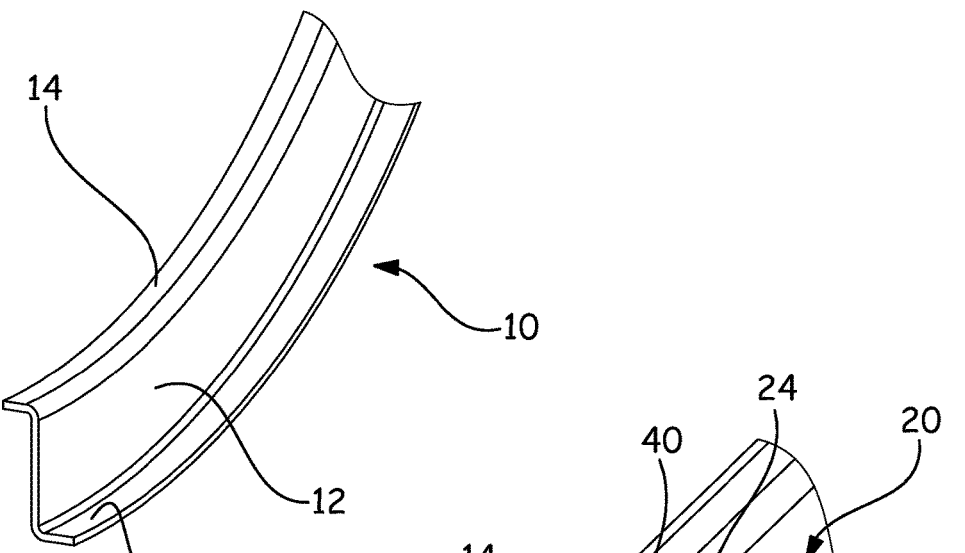
FIG. 1 is a perspective view of a portion of an aircraft fuselage frame.

FIG. 1 shows a fuselage frame 10 in the form of a profile with a Z-shaped cross-section whose central portion referred to as a core 12 forms a complete or partial ring. The profile comprises a first wing 14 referred to as an inner wing arranged in the area of the inner edge of the core 12 and perpendicular to the latter, and a second wing 16 referred to as an outer wing arranged in the area of the outer edge of the core 12, also perpendicular to the latter.

To give an order of magnitude, the core 12 has an 80 mm height and a thickness on the order of 4 to 6 mm. The wings 14, 16 have a width in the order of 30 mm.

The invention is not limited to this sectional shape and to this application. Thus, the invention can make it possible to achieve several curved profiles with a J, Z, L, Omega-shaped section, or the like.

According to the invention, the profile 10 is curved along an axis of rotation X (FIG. 4) and a radius of curvature R. Thus, the curved profile 10 comprises at least one first section, more particularly the core 12, in a plane perpendicular to the rotation axis X and at least one second section, more particularly the wing 14, in a plane parallel to the axis X. The different sections of the profile are connected together by curved sections. Thus, a first surface of a first section is continuous with a first surface of each other section. These first surfaces form a surface later referred to as an outer surface. Similarly, a second surface of the first section is continuous with a second surface of each other section. These second surfaces form a surface later referred to as an inner surface. The latter comprises portions oriented toward the rotation axis X.

According to the invention, the curved profile 10 comprises a stack of N plies, N being an integer greater than ten. To give an order of magnitude, the profile comprises fifty or so plies.

The plies comprise pre-impregnated fibers oriented for each ply along one direction.

The curved profile is obtained from a rectilinear preform 20 having transverse sections identical to those of the curved profile 10 to be obtained.

Longitudinal direction is to be understood as the largest dimension of the rectilinear preform. A transverse plane is a plane perpendicular to the longitudinal direction.

The rectilinear preform 20 is obtained by stacking the N plies necessary to form the curved profile on a deformable mandrel 22.

By deformable, it is to be understood that the mandrel can become deformed between a rectilinear position and a curved position but has an incompressible or quasi-incompressible transverse section.

According to an embodiment, the mandrel is an elastomer.

The deformable mandrel 22 comprises a section, complementary to that of the curved profile.

The N plies of the curved profile are stacked on top of one another, the first ply being laid on the mandrel forming the outer surface of the profile and the last ply laid forming the inner surface of the profile.

Figure 2:
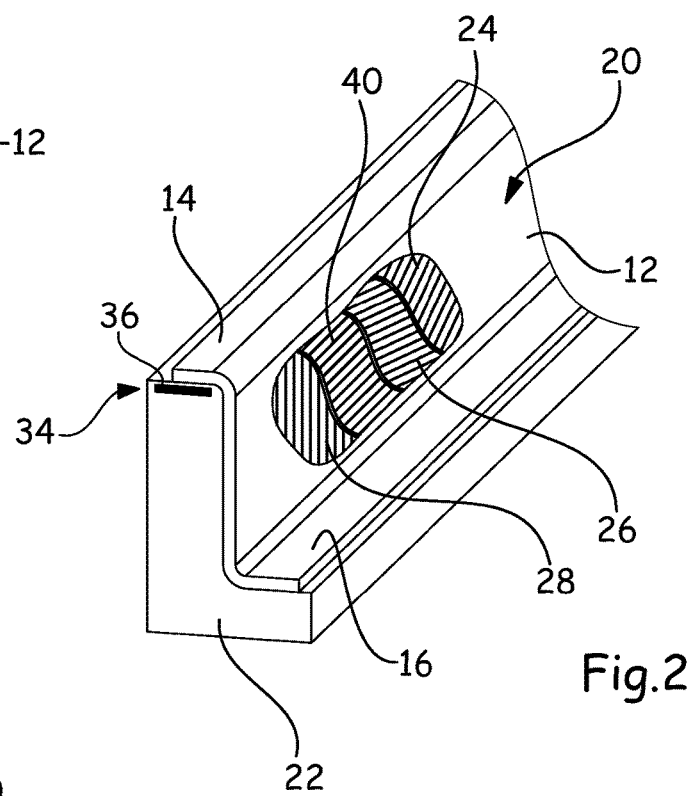
FIG. 2 is a perspective view of a stacking of plies on a rectilinear deformable mandrel with a cut-away for showing the orientation of the fibers of the stacked plies.
Figure 3:
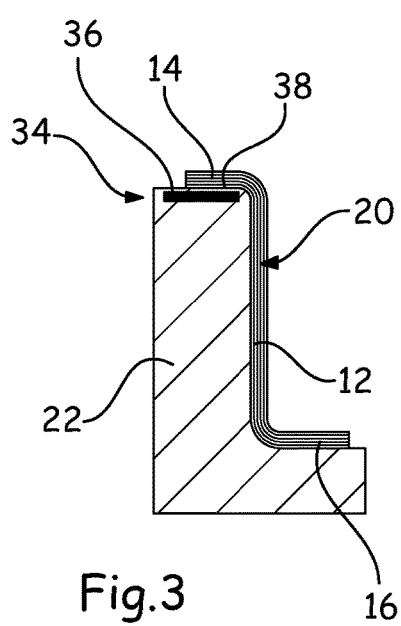
FIG. 3 is a transverse cross-section of the stack of fiber plies and of the mandrel of FIG. 2.

As shown in FIG. 2, certain plies 24 can have fibers oriented at A° relative to the longitudinal direction and other plies 26 can have fibers oriented at −A° relative to the longitudinal direction, A can vary from 10 to 90°.

These values A are determined as a function of the mechanical characteristics which are sought. These values A are determined by the research department and must respect a tolerance interval of +/−3°. Therefore, when the nominal value A is of 30°, the fibers must form an angle with the longitudinal direction comprised between 27° and 33°.

By way of example, certain plies can have fibers oriented at 30° and other plies, fibers oriented at −30°. Certain plies can have fibers oriented at 60° and other plies, fibers oriented at −60°. Certain plies 28 can have fibers oriented at 90°.

According to an important point of the invention, for each value A, the curved profile comprises as many plies with fibers oriented at A as plies with fibers oriented at −A°. When the curved profile 10 comprises a stack of 10 to 20 plies, it can comprise M' plies with fibers oriented at A° and M'+/−1 plies with fibers oriented at −A°. Beyond 20 plies, the profile can comprise M plies with fibers oriented at A° and M+/−5% plies with fibers oriented at −A°.

Advantageously, a ply with fibers oriented at A° is adjacent to a ply with fibers oriented at −A°.

Figure 4:
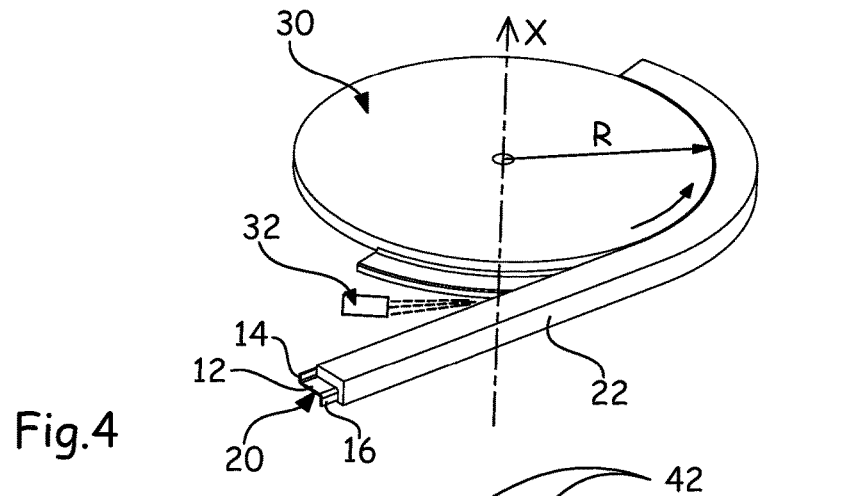
FIG. 4 is a schematic view of a bending tool used to curve the stack of plies and the mandrel of FIG. 2.

When all the plies of the curved profile 10 are arranged on the deformable mandrel 22, a bending phase is implemented using a bending tool 30 having sections complementary to the sections of the inner surface of the curved profile. During the bending phase, the mandrel and all the plies are wound on the bending tool 30, as shown in FIG. 4.

At least the deformation zone of the rectilinear preform 20 is brought to a temperature on the order of 70° C. According to an embodiment, the bending tool 30 comprises integrated heating means for heating the surface of the tool in contact with the plies. According to another preferred embodiment, heating means 32 are provided outside the bending tool and allow for heating the plies only in the deformation zone.

The per unit length speed of bending is a function, in particular, of the capacity of the means for heating the section of the rectilinear preform subjected to bending. By way of example, the per unit length speed is greater than or equal to 1.5 mm/s.

The bending tool is not further described since it can be identical to the tool of the prior art give or take some minor modifications.

Advantageously, the deformable mandrel 22 comprises a neutral fiber 34, as close as possible to the inner wing 14. In practice, the deformable mandrel 22 comprises a reinforcement causing the mandrel to become inextensible along the longitudinal direction at the level of the reinforcement, in the form of a blade 36 which extends along the longitudinal direction, over the entire length of the mandrel, the section of the blade 36 being oriented so that the length of the section is parallel to a wing of the curved profile.

The curved profile 10 can comprise plies 40 with fibers oriented at 0°, parallel to the longitudinal direction. In this case, these plies 40 cannot extend over the entire width of the preform but rather only on the zone corresponding to the outer wing 16. At any rate, it is preferable to lay the plies with fibers at 0° only on the zones provided outside of the neutral fiber 34. Thus, during the bending operation, the fibers at 0° are subjected only to traction forces and to no compression forces capable of generating wrinkling.

Preferably, the reinforcement must be arranged as close as possible to the axis of rotation X. According to an embodiment, the blade 36 is separated by a small distance, on the order of a millimeter, from the surface 38 of the mandrel in contact with the inner wing 14.

Thus, when the neutral fiber 34 is arranged in the vicinity of the inner wing 14, the ply or plies with fibers oriented at 0° can extend over the entire width of the profile, even in the area of the inner wing 14.

The bending operation of all the plies during a single continuous bending operation is possible because of the identical or quasi-identical number of plies with fibers oriented at A° and plies with fibers oriented at −A°.

Figure 5:
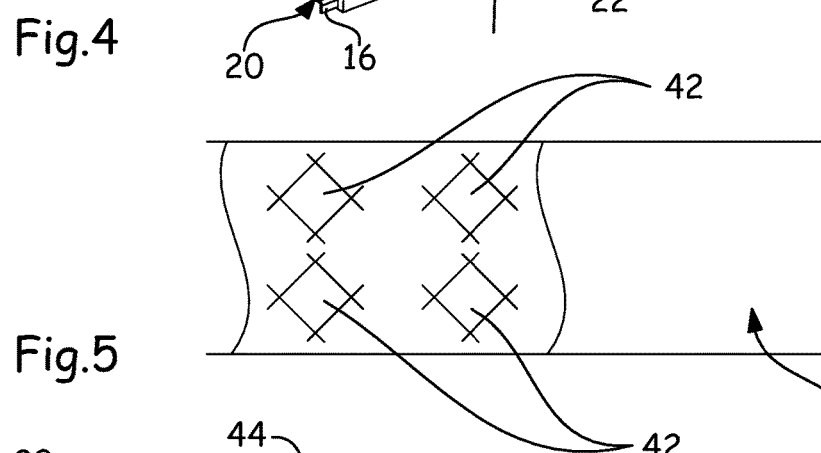
FIG. 5 shows the orientation of certain fibers before the bending.

The fibers oriented at A° form, with the fibers oriented at −A°, all identical elementary lozenges 42 when the preform is rectilinear as shown in FIG. 5. After deformation, the elementary lozenges are always symmetrical with respect to a radial direction 44. During the deformation, the intersection points of the fibers A° and −A° act as knots in the area of which the fibers pivot. Therefore, the plies having fibers oriented at A° and those with fibers oriented at −A° deform without wrinkling.

Figure 6A:
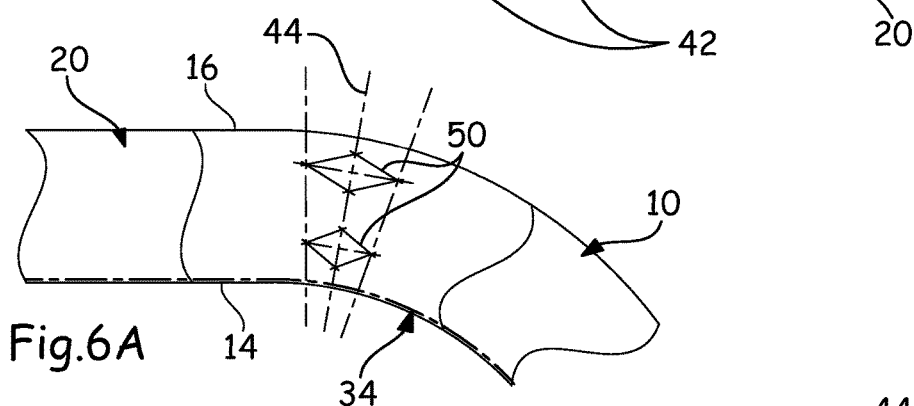
FIG. 6A shows the orientation of the same fibers as FIG. 5 after the bending operation according to a first alternative of the invention.
Figure 6B:
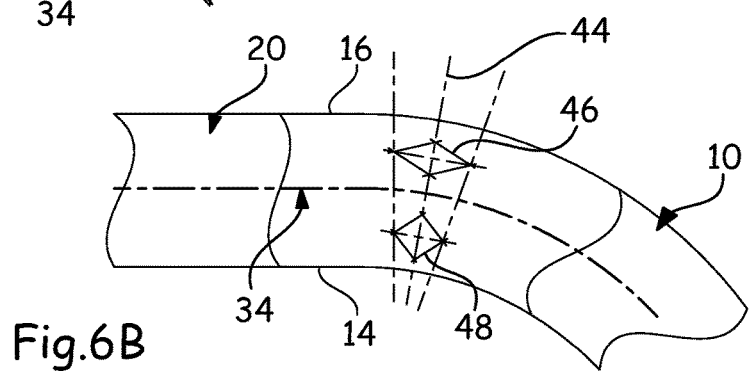
FIG. 6B shows the orientation of the same fibers as FIG. 5 after the bending operation according to another alternative of the invention.

According to an embodiment in FIG. 6B, when the neutral fiber 34 is arranged between the two wings 14 and 16, all the elementary lozenges become deformed symmetrically with respect to radial directions 44. However, the elementary lozenges 46 located between the neutral fiber 34 and the outer wing 16 extend along a direction, perpendicular to the radial direction. Conversely, the elementary lozenges 48 located between the neutral fiber 34 and the inner wing 14 expand along the radial direction but diminish along the direction, perpendicular to the radial direction. Even if the deformations are symmetrical relative to the radial directions 44, the elementary lozenges 46 extend more than the elementary lozenges 48. Consequently, to limit the risks of wrinkling in the vicinity of the inner wing 14, it is preferable to bring the neutral fiber 34 closer to the inner wing 14.

According to a preferred embodiment shown in FIG. 6A when the neutral fiber 34 is arranged in the area of the inner wing 14, all the elementary lozenges 50 extend along a direction, perpendicular to the radial direction. In this case, all the fibers are subjected to a traction force and no wrinkling is possible.

As shown in FIG. 6A, the orientation of the fibers oriented at A° and −A° in the rectilinear preform is modified after bending.

Thus, the angle formed by the fibers initially oriented at A° decreases as a function of the spacing apart of the rotation axis X, whereas that formed by the fibers oriented at −A° increases as a function of the spacing apart of the rotation axis X.

Considering the tolerance interval of +/−IT determined by the research department to be on the order of +/−3°, the fibers meant to be oriented at A° are positioned at A+IT° before bending and the fibers meant to be oriented at −A° are positioned at −(A+IT)° before bending. According to this arrangement after the bending phase, all the fibers are correctly oriented and form an angle +A+/−IT or −A+/−IT.

This arrangement makes it possible to significantly increase the height of the core. By way of example, the height of the core was limited to approximately 80 mm in the prior art whereas they can reach approximately 170 mm in the invention.

When A=30° and the tolerance interval is +/−3°, before deformation, the fibers of certain plies are oriented at +33°, whereas the fibers of other plies are oriented at −33°. In this case, after bending, all the fibers are correctly oriented and respect the tolerance interval. Thus, for certain plies, the fibers close to the inner wing 14 are oriented at 33° and the fibers close to the outer wing 16 are oriented at 27° and all respect the orientation 30°±/−3°.

After the bending step, the bent plies are polymerized. According to an embodiment, the deformable mandrel can be removed and a bladder can be applied above the bent preform to exert a pressure on the plies during the temperature cycle. Alternatively, the bladder can be attached above the mandrel during the polymerization phase, the mandrel ensuring the function of a plate to conform the outer surface of the curved profile.

The method of the invention provides the following advantages:

First, the method allows for the cost and implementation time to be drastically reduced insofar as all the plies are bent in a single phase and not according to a step-by-step method.

Second, the method of the invention makes it possible to limit the rejects due to the absence of wrinkling or bridging in the area of the radii of curvature.

According to another advantage, it is possible to make profiles with cores having greater dimensions.

Finally, the method provides a better control of the aging of the resin insofar as the deformed portion is subjected to a rise in temperature.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method of manufacturing a curved profile having a longitudinal dimension extending in a longitudinal direction from a rectilinear preform of pre-impregnated fiber plies-comprising the steps:
   stacking N plies of fibers on a deformable mandrel to form a preform, wherein N comprises at least 10 plies, and wherein the preform is rectilinear,
   winding the N plies sandwiched between the deformable mandrel and a bending tool along an axis of rotation in a direction tangential to a radius of curvature of the bending tool to deform the preform, and
   polymerizing said bent N plies to form a curved profile with at least one first section of the curved profile being arranged along a plane perpendicular to the axis of rotation and at least one second section of the profile being arranged along a plane parallel to the axis of rotation, wherein the curved profile includes a width extending perpendicular to the longitudinal direction,
   wherein said N plies and said curved profile comprise:
      M plies with fibers oriented at A° relative to the longitudinal direction and about M plies with fibers oriented at −A° relative to the longitudinal direction,
      wherein a ply with fibers oriented at A° relative to the longitudinal direction is arranged adjacent to a ply with fibers oriented at −A° relative to the longitudinal direction, and at least one ply with fibers orientated parallel to the longitudinal direction, and wherein the at least one ply with fibers orientated parallel to the longitudinal direction does not extend over the width of the curved profile, wherein the fibers oriented at A° and the fibers oriented at −A° form a plurality of rhombuses, wherein the rhombuses are identical in the preform when the preform is rectilinear, wherein, after the preform is deformed, the rhombuses are symmetrical with respect to a radial direction, and, wherein the intersection points of the fibers A° and −A° act as knots in the area of which the fibers pivot during the deformation.

2. The method according to claim 1, wherein when the curved profile comprises a stack of 10 to 20 plies, the stack comprises M' plies with fibers oriented at A° relative to the longitudinal direction and about M' plies with fibers oriented at −A° relative to the longitudinal direction.

3. The method according to claim 1, including the step of heating the plies during bending only in a deformation zone.

4. The method according to claim 3, comprising heating the plies in the deformation zone at a temperature on the order of 70° C.

5. The method according to claim 1, including using a deformable mandrel with a reinforcement therein causing the mandrel to become inextensible along the longitudinal direction at a level of the reinforcement.

6. The method according to claim 5, including using a deformable mandrel with the reinforcement arranged in a portion of the mandrel closest to the axis of rotation.

7. The method according to claim 1, wherein said profile comprises a ply with fibers meant to be oriented at A° relative to the longitudinal direction with a tolerance interval of +/−IT, comprising the step of positioning said fibers meant to be oriented at A° at A+IT° relative to the longitudinal direction before bending.

8. The method according to claim 1, wherein said profile comprises a ply with fibers meant to be oriented at −A° relative to the longitudinal direction with a tolerance interval of +/−IT, comprising the step of positioning said fibers meant to be oriented at −A° at −(A+IT)° relative to the longitudinal direction before bending.

9. The method according to claim 1, wherein a per unit length speed of the bending is greater than or equal to 1.5 mm/s.

10. A method of manufacturing a curved profile having a longitudinal dimension extending in a longitudinal direction from a rectilinear preform of pre-impregnated fiber plies comprising the steps:

stacking N plies of fibers on a deformable mandrel, wherein the deformable mandrel comprises a neutral fiber and, wherein the N plies of fibers comprises at least 10 plies with at least one ply with fibers orientated parallel to the longitudinal direction;

winding the deformable mandrel and the N plies of fibers on a bending tool along a rotation axis and in a direction perpendicular to a radius of curvature of the bending tool at a rate of at least 1.55 mm/s in order to bend the N plies sandwiched between the deformable mandrel and the bending tool; and, polymerizing said bent N plies to provide a curved profile, at least one first section of the profile being arranged along a plane perpendicular to the axis of rotation and at least one second section of the profile being arranged along a plane parallel to the axis, the curved profile and the N plies of fibers comprising M plies with fibers oriented at A° relative to the longitudinal direction and about M plies with fibers oriented at −A° relative to the longitudinal direction, wherein the at least one first section of the profile comprises an inner wing, and wherein the at least one second section of the profile comprises a core, and wherein the neutral fiber of the deformable mandrel is disposed proximate the inner wing;

wherein the fibers oriented at A 0 and the fibers oriented at −A° form a plurality of rhombuses, wherein the rhombuses are identical in the preform when the preform is rectilinear, wherein, after the preform is deformed, the rhombuses are symmetrical with respect to a radial direction, and, wherein the intersection points of the fibers A 0 and −A 0 act as knots in the area of which the fibers pivot during the deformation.

11. The method of claim 9 wherein the at least one first section of the profile comprises an inner wing, and wherein the at least one second section comprises a core, and wherein the neutral fiber of the deformable mandrel is disposed proximate the inner wing.

12. The method of claim 11 wherein the profile further comprises an outer wing being arranged along a plane perpendicular to the axis of rotation.

13. The method according to claim 1, wherein the at least one ply with fibers orientated parallel to the longitudinal direction is arranged only on zones provided outside of a neutral fiber.

14. The method of claim 10 wherein the profile further comprises an outer wing being arranged along a plane perpendicular to the axis of rotation.

* * * * *